July 1, 1969 C. T. PARDOE 3,453,541
TIME INTERVAL PLOTTING APPARATUS FOR AN INPUT PULSE SERIES
Filed April 4, 1966
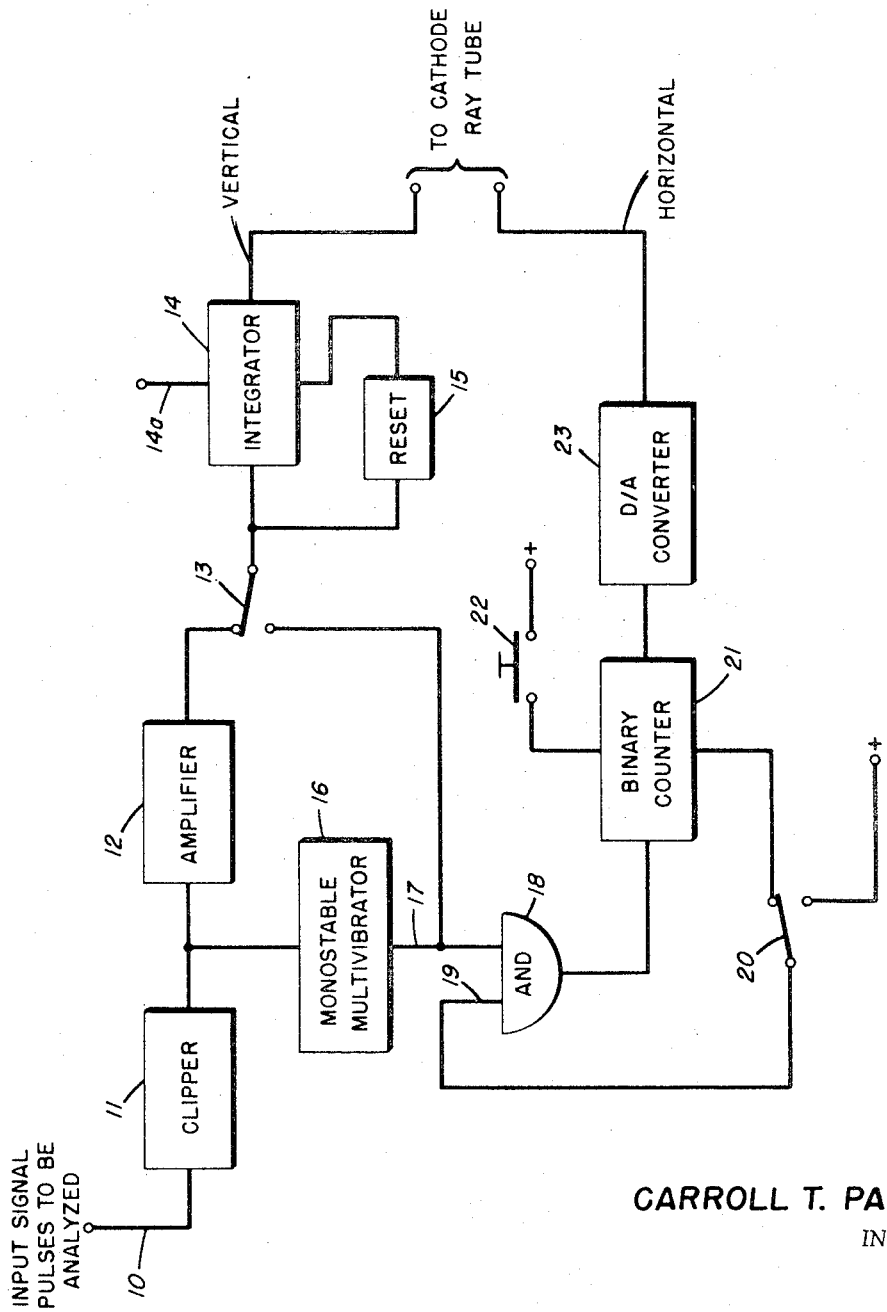
CARROLL T. PARDOE
INVENTOR

United States Patent Office 3,453,541
Patented July 1, 1969

3,453,541
TIME INTERVAL PLOTTING APPARATUS FOR AN INPUT PULSE SERIES
Carroll T. Pardoe, Baltimore, Md., assignor to the United States of America as represented by the Secretary of the Navy
Filed Apr. 4, 1966, Ser. No. 540,095
Int. Cl. G01r 23/16, 27/02, 13/20
U.S. Cl. 324—77            10 Claims

ABSTRACT OF THE DISCLOSURE

Circuitry is disclosed for receiving input signal pulses and developing therefrom control signals whose respective magnitudes are proportional to the width or time interval of each input pulse and each interpulse time interval. A switch selectively applies one of these control signals to one axis of a two dimensional display. The input signal pulses are also counted and produce another control signal whose magnitude is proportional to input pulse count and which is applied to the other axis of the display, such that a plot of either pulse width or interpulse interval versus pulse number is produced. A second switch is utilized for selecting either a single or reoccurring plot on the display.

---

This invention generally relates to waveform analysis and more particularly pertains to apparatus for automatically providing a visual plot of the elapsed time of each event in a reoccurrence of events and/or the time interval between such events as a function of event number.

It is frequently necessary, for example, in bio-medical electronic research, to produce a plot of pulse width verse pulse number, or a similar problem, pulse period versus interval number, from an input pulse series wherein one pulse is produced each time a predetermined physiological event occurs and each pulse width corresponds to the interval or duration of each physiological event. Heretofore, such plotting generally required a considerable amount of tedious measurement of oscillograph records and hand plotting. On the other hand, the present invention produces such plots automatically in real time and at modest cost.

More specifically, it is proposed in accordance with the present invention to initially shape the input pulses to obtain a corresponding series of constant amplitude square pulses, while maintaining the width of the pulses proportional to the time duration of the reoccurring events. These square pulses are then applied to a suitable integrating circuit whose integrating time constant is much larger than the expected time duration or pulse width of each input pulse, so that a good degree of linearity is obtained. Thus, the peak amplitude achieved by the integrating circuit during each applied square pulse is a linear function of the time duration or pulse width of each of the input signal pulses; i.e., the output of the integrator is an analog of the time interval of each event marked by the applied input pulses. In accordance with the present invention, the output of the integrator is then applied, for example, to the vertical input of a cathode ray oscilloscope, so that the vertical displacement of the oscilloscope beam is then a direct measure of the time duration of each event being analyzed.

In accordance with the present invention, the input pulses are also applied to a binary counter which registers, in digital form, a count of the input pulses. Suitable digital to analog converter means are then connected to the output of the binary counter to produce an analog signal of pulse count, which is then applied to the horizontal input of the cathode ray oscilloscope. Consequently, the oscilloscope beam is deflected, in the horizontal direction, a small increment each time an event or input pulse occurs.

Since the vertical deflection for each input pulse or event occurrence, is proportional to event duration and since the horizontal deflection is proportional to event number, a plot is developed on the oscilloscope of the elapsed time of each event in the reoccurrence versus event number. It should be understood at this time that the aforementioned use of the cathode ray oscilloscope as a means for displaying the desired visual plot is merely by way of example, since a conventional X-Y plotter could be directly substituted for the oscilloscope.

As previously discussed, it is often desirable to provide a visual plot of the time between events or input pulses as a function of event or pulse number, rather than or in addition to a plot of event duration (pulse width) versus event or pulse number. Accordingly, the present invention provides for producing and supplying the integrator circuit mentioned above, when a plot of time between input pulses versus pulse number is desired, with pulses whose widths are directly proportional to the interpulse period of the applied input pulse series. As a result, the output of the intergrator which is then applied to the vertical deflection circuitry of the cathode ray oscilloscope is an analog of the time between successive input pulses. In the illustrated embodiment of the present invention to be described in detail hereinafter, a simple switching means is employed at the input to the integrating circuitry to selectively apply either the pulses whose respective pulse widths are proportional to the elapsed time of each of the reoccurring events or the pulses whose respective pulse widths are proportional to the time interval between such events to the integrator.

In view of the above, one object of the present invention is to provide apparatus for automatically plotting the pulse width and/or time between pulses versus pulse number, in response to an input pulse series.

A further object of the present invention is to provide such automatic plotting where each successive pulse of the input pulse series marks an occurrence of a predetermined event and the width of each pulse is proportional to the elapsed time of the event during such occurrence.

A further object of the present invention is to provide selectively for either a single or a reoccurring plotting operation, as desired, of pulse width and/or time between pulses versus pulse number, in response to an input pulse series.

Other objects, purposes and characteristic features of the present invention will be in part pointed out as the description of the invention progresses and in part be obvious from the accompanying drawing which illustrates, in block diagram form, one embodiment of the present invention for affecting an automatic plot of an input pulse series on a cathode ray tube oscilloscope.

Referring now to the embodiment shown in the drawing, the input signal pulses to be analyzed by the apparatus of the present invention are applied thereto via an input line designated at 10. Without attempting to limit the spirit or scope of this invention, these input pulses might, for example, be supplied from an electronic simulator of a physical neuron; each input pulse marking a firing of the artificial neuron and each pulse width representing an analog of the time of firing. These input pulses are first applied to a suitable clipper circuit 11 adapted to remove low level signals and to provide a reference amplitude for the measurement of the width of the input pulses.

The output from the clipper circuit 11 is thus a series of constant amplitude pulses whose respective pulse widths correspond to the widths of the input pulses and which are next applied to a suitable amplifier circuit 12 which provides gain great enough to produce essentially rectangular or square pulses without appreciably modifying the width of each of the clipped pulse inputs. The output of the amplifier 12 is then applied through switch 13, in its upper or illustrated position, to a suitable integrator 14 of any convenient design and including, for example, a capacitor which charges to a peak voltage whose value is dependent upon the time for which the capacitor is permitted to charge. The integrating time constant of the integrator 14 is selected such that linearity is obtained and the maximum or peak amplitude achieved by the integrating circuit during each applied pulse is directly proportional to the width of that applied pulse. A test terminal 14a is provided, as shown in the drawing, to permit the operation of the integrator 14 to be monitored.

A suitable reset circuit 15 is connected to the integrator 14 and operates in a conventional manner to clear the integrator between input pulses. For example, the reset 15 might include a reed relay driven by a suitable driving transistor in such a manner that a relay contact is normally closed to shunt the integrating capacitor in the integrator 14 so long as no input pulse is being applied thereto, but, the relay operates to remove this shunt whenever a pulse is applied.

The output of the integrator 14 is thus a series of ramp voltages, each of which has a maximum or peak amplitude directly proportional to the pulse width of a corresponding input pulse. This output from the integrator 14 is applied, via the line labelled VERTICAL, to the vertical deflection circuitry of a suitable cathode ray tube oscilloscope, for example, such that the oscilloscope beam is deflected vertically for each input pulse, by an amount directly proportional to the width of that input pulse. As previously mentioned, other types of display means, such as a conventional X-Y plotter, having two display axes and a marker (electron beam, pen, etc.) which displaces relative to each of the display axes in accordance with the magnitude of a control signal applied for that axis, may be used in place of the cathode ray oscilloscope.

The output pulses from the clipper circuit 11 are furthermore applied to a monostable multivibrator circuit 16. Each of these pulses is effective to trigger the multivibrator 16 in such a manner that a relatively narrow output pulse is produced, at output 17 from the multivibrator 16, for each input pulse applied thereto. The output pulses from the monostable multivibrator 16 are applied, on the one hand, as one input to a suitable AND gate 18, and on the other hand, to the lower contact of the switch 13, which is shown open in the drawing. The purpose for applying the output pulses from the monostable multivibrator 16 to the lower contact of switch 13 will be described in more detail hereinafter.

The other input 19 to the AND gate 18 is connected, via switch 20 in its upper or illustrated position, to a binary counter 21 which may be of any conventional design such as a plurality of flip-flop circuits. As will be described in more detail hereinafter, this input 19 to the AND gate 18 is derived from a predetermined stage of the binary counter 21 such that the input 19 of the AND gate 18 is enabled until the binary counter 21 registers a predetermined count. Consequently, the AND gate 18 operates to pass each of the output pulses appearing at 17 from the monostable multivibrator 16 until the binary counter 21 reaches the predetermined count; i.e., until the input 19 to the AND gate 18 is disabled. Preferably, the binary counter 21 is provided with automatic resetting circuitry, well-known to those skilled in the art, such that it will automatically return to a zero count after its maximum count capability is exceeded. A switch 22 is provided to enable the binary counter 21 when operation of the circuitry shown in the drawing is desired.

A digital to analog converter 23 is connected to the output of the binary counter 21 and operates in a conventional way to convert the digital count registered by the binary counter 21 into a suitable analog signal whose magnitude is directly proportional to the count registered by the counter 21, and which count analog signal is then applied, via the line labelled HORIZONTAL, to the horizontal deflection circuitry of the cathode ray oscilloscope. Thus, the oscilloscope beam is deflected in its horizontal or sweep direction by a predetermined incremental amount each time the count in binary counter 21 is increased or, in other words, each time a new input pulse is applied to the circuitry shown in the drawing.

In view of the foregoing, the cathode ray oscilloscope thus provides a plotting of the pulse width of the applied input pulses versus pulse number, and, inasmuch as each input pulse width is proportional to the time interval of one event in a reoccurrence of such events, as previously mentioned, the oscilloscope plots a curve of the elapsed time of each event versus event number.

The apparatus shown in the drawing is furthermore capable of providing a plot of the time between events versus event number or, in other words, interpulse interval versus pulse number. More specifically, if the switch 13 is in its lower position, the output 17 from the monostable multivibrator 16 is connected also as input to the integrator 14. The output 17 from the multivibrator is selected such that during each interpulse period of the original input pulses, the pulse output at 17 will have the same polarity as that of the output pulses from amplifier 12. Consequently, during the time between input pulse, the integrator 14 is enabled and, for each interpulse period, produces an output ramp signal whose maximum amplitude is proportional to the time duration of such interpulse period. This output from the integrator 14, when applied to the vertical deflection circuitry of the cathode ray oscilloscope, causes the oscilloscope beam to be deffected in a vertical direction by an amount directly proportional to the interpulse interval.

At the same time, the binary counter 21 registers a count of the input pulses and, by means of the digital to analog converter 23, energizes the horizontal deflection circuitry of the cathode ray oscilloscope with an analog signal whose magnitude is proportional to input pulse number. Thus, with switch 13 in its lower position, the oscilloscope is made to plot interpulse interval as a function of pulse number or, in other words, the time between events versus event number.

The switch 20 in its upper or illustrated position causes the oscilloscope to perform only a single plotting operation since the AND gate 18 is disabled by the removal of the enabling signal from input 19, when the binary counter 21 reaches its predetermined count. However, if the switch 20 is positioned to engage its lower contact, the input 19 of the AND gate 18 is continually supplied with an enabling signal, designated at (+) in the drawing, so that the output pulses from the monostable multivibrator 16 are continually applied and counted by the binary counter 21. As previously mentioned, the counter 21 is capable of automatically returning to its zero count position, each time its maximum count capability has been exceeded. Thus, with the switch 20 in its lower position, the cathode ray oscilloscope is caused to provide a repeated plotting of either time or event versus event number or time between events versus event number, as selected by switch 13.

Obviously, many modifications and variations of the present invention are possible in light of the above teachings. It is therefore to be understood at this time that within the scope of the appended claims, the invention may be practiced otherwise than as specifically described.

What is claimed is:

1. Apparatus for producing a visual plot of the elapsed time of each event in a recurrence of events versus event number, in response to a series of input signal pulses applied thereto wherein each pulse of said series marks an occurrence of said event and the width of each pulse is proportional to the time interval of said event during said occurrence, said apparatus comprising
display means having first and second axes of display and a marker which displaces relative to each of said axes in accordance with the magnitude of a control signal applied to said display means for the respective axis of display, means operably connected to receive said input pulse series and responsive to the width of said input pulse series and responsive to the width of said input pulses for generating a first output control signal whose magnitude varies in proportion to the pulse width of each of said input pulses, means operably connected to apply said first output control signal to said display means for controlling the displacement of said marker relative to the first display axis thereof, counting means operably connected to receive said input pulse series for counting said input pulses, means operably connected to said counting means for producing a second output control signal whose magnitude varies in proportion to the count registered by said counting means, and means operably connected to apply said second output control signal to said display means for controlling the displacement of said marker relative to the second display axis thereof.

2. The apparatus specified in claim 1, further including
means responsive to said input pulse series for producing a second pulse series wherein one pulse is produced during each interpulse interval of said input pulse series and the pulse width of each pulse in said second pulse series is proportional to the duration of said interpulse interval, and switching means adapted to selectively apply either said input pulse series or said second pulse series to said first output control signal generating means dependent respectively upon whether a plot of the elapsed time of each event versus event number or a plot of the time between said events versus event number is desired.

3. The apparatus specified in claim 1 wherein said first output control signal generating means comprises an integrating circuit.

4. The apparatus specified in claim 3 further including
circuit means responsive to said input pulse series for shaping said input pulse series to obtain a corresponding series of constant amplitude square pulses, each having a pulse width directly proportional to the pulse width of a corresponding pulse in said first pulse series, said circuit means being connected to apply said square pulses to said integrating circuit, and reset circuit means operably connected to said integrating circuit and said circuit means for clearing said integrating circuit between each of said square pulses.

5. The apparatus specified in claim 1 wherein said display means is a cathode ray tube having horizontal and vertical display axes and associated deflection circuitry,
said first output control signal being applied to said vertical deflection circuitry, and
said second output control signal being applied to said horizontal deflection circuitry.

6. The apparatus specified in claim 1 wherein said counting means registers a count of said input pulses in digital form, and wherein said second output control signal generating means comprises a digital to analog converter for converting the digital count registered by said counting means into an analog signal proportional to said registered count for application to said display means.

7. The apparatus specified in claim 6 further including a monostable multivibrator circuit connected to be triggered by said input pulses so as to produce an output pulse of fixed pulse width for each input pulse and having its output operably connected to supply said fixed pulse width pulses to said counting means.

8. The apparatus specified in claim 7 wherein said counting means is a binary counter having a maximum count capability and being automatically reset when said maximum count is exceeded and further including
an AND gate having first and second input circuits and a single output circuit and being effective to permit an output pulse to appear in its said output circuit only when its said first and second input circuits are concurrently supplied with enabling signals, said single output circuit being connected to apply input pulses to said counting means to be counted, said first input circuit being connected to the output of said monostable multivibrator circuit and being supplied with an enabling signal each time a fixed width output pulse is produced by said monostable multivibrator, and said second input circuit being connected to said counting means and being continually supplied with an enabling signal until said counting means reaches a predetermined count, whereby said AND gate is disabled when said predetermined count is reached so that said counting means stops counting and only a single plotting operation is thereby made on said display means.

9. The apparatus specified in claim 8 wherein said second input circuit of said AND gate is connected continually to an enabling signal, whereby said counting means is controlled to repeatedly count to its maximum count and then reset so that a repetitive plotting operation is therefore performed by said display means.

10. The apparatus specified in claim 8 and further including
a source of continual enabling signal independent of said counting means, and
selecting means for selectively connecting said second input circuit of said AND gate to an enabling signal either from said counting means or from said source of continual enabling signal,
whereby said display means can be made to perform either a single or a repetitive plotting operation.

References Cited

UNITED STATES PATENTS 3,230,400  1/1966  Blue
3,250,990  5/1966  Hubbs et al.
3,317,832  5/1967  Webb.

RUDOLPH V. ROLINEC, *Primary Examiner.*

P. F. WILLE, *Assistant Examiner.*

U.S. Cl. X.R.

324—121